Patented May 25, 1948

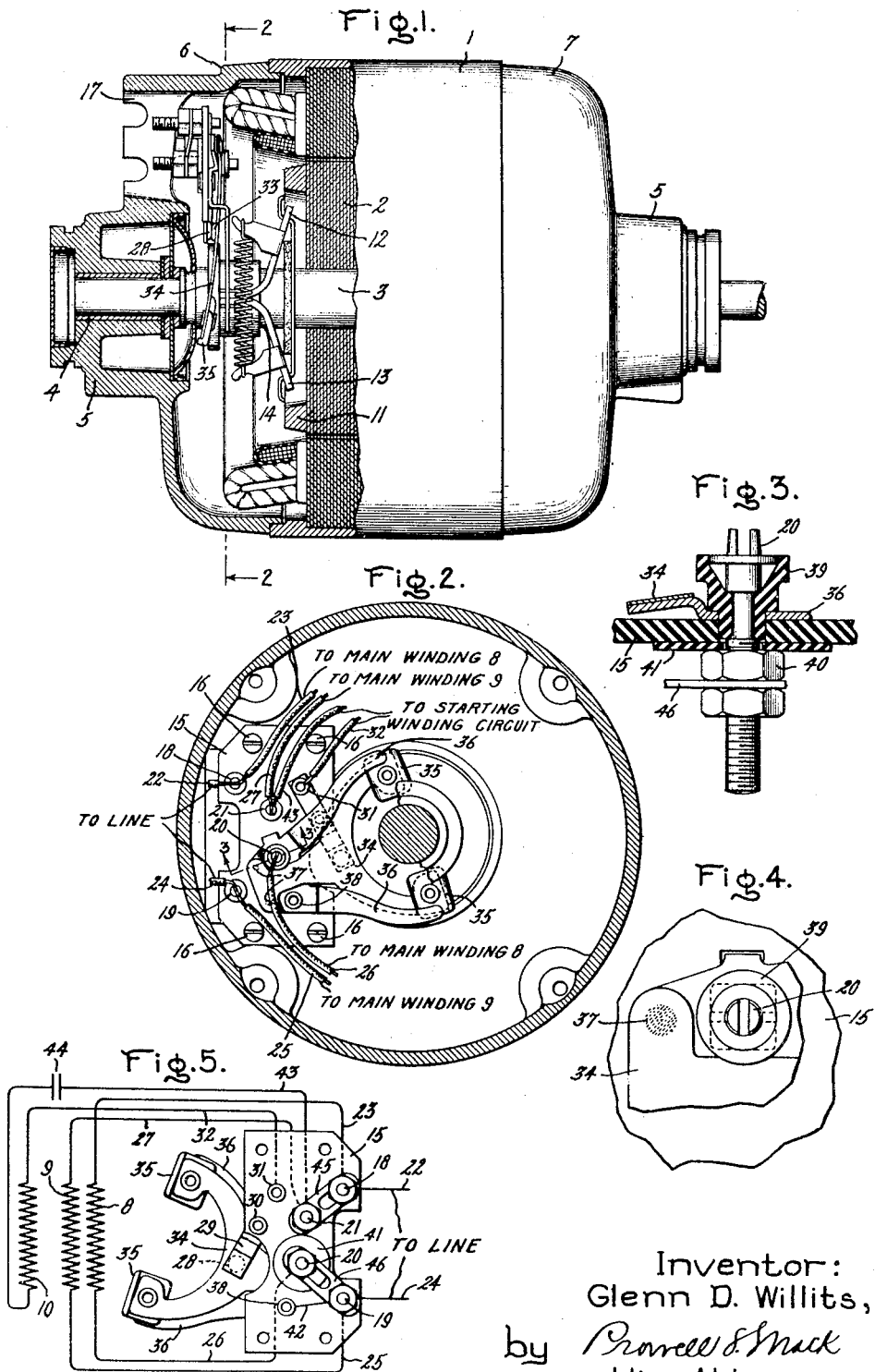

2,442,227

UNITED STATES PATENT OFFICE 2,442,227

MOTOR SWITCH, MOUNTING AND TERMINAL BOARD

Glenn D. Willits, Leo, Ind., assignor to General Electric Company, a corporation of New York Application September 24, 1946, Serial No. 698,979

7 Claims. (Cl. 318—225)

1

My invention relates to switches, such for example as those used in dynamoelectric machines and generally employed for controlling the circuits of starting windings in single phase induction motors, repulsion induction motors, or other electrical devices in which it is desired to control the circuits thereof or other circuits in accordance with the speed of rotation of the switch or of some other related member. More specifically, this invention contemplates such a switch wherein the switch mounting assembly is adapted to serve as a terminal board accessible from the exterior of the machine for making the external connections and altering the internal circuit arrangement.

An object of my invention is to provide an improved switch which is simple in construction, reliable in operation, and which can be readily manufactured and is adaptable for use on more than one voltage.

Another object of my invention is to provide an improved mounting assembly for a dual voltage centrifugally actuated switch and which is adapted to serve as a terminal board.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a partial sectional side elevational view of a dynamoelectric machine provided with an embodiment of my invention; Fig. 2 is a sectional view taken along line 2—2 of Fig. 1 and turned through about 90°; Fig. 3 is an enlarged sectional view taken along line 3—3 of Fig. 2; Fig. 4 is an enlarged view of an end of an insulated stud and associated parts of the switch shown in Figs. 2 and 3; and Fig. 5 is a schematic diagram of the connection of the motor field winding circuits as connected to the switch member shown in Figs. 1 and 2.

Referring to the drawing, I have shown a dynamoelectric machine having a stationary member 1 and a rotatable member 2 mounted on a shaft 3 which is journaled in bearings 4 supported in hubs 5 formed on end shields 6 and 7 of the stationary member of the machine. In this instance, the dynamoelectric machine is shown as a single phase induction motor and excitation is adapted to be provided thereto by a single phase running field exciting winding which is wound as two main field exciting windings 8 and 9 and a

2 starting field exciting winding 10. The rotatable member is shown as provided with a cast squirrel cage winding 11 of any suitable conventional type.

In this type of induction motor, it is desirable that the starting field exciting winding should be energized during the period when the motor starts to operate or under such operating conditions that the speed of the motor is reduced beyond a predetermined value and that this starting field exciting winding be deenergized when the speed of the motor exceeds a predetermined value. Furthermore, when the main field exciting winding is wound as two field exciting windings 8 and 9, as in this instance, the motor may be connected for operation on two different voltages, that is, on a predetermined low voltage and a second voltage which may be substantially twice the low voltage and thus can be made to operate as a dual voltage motor. In order to accomplish this, I provide a speed responsive switch which is adapted to be connected for either a low or a high voltage source of supply and which is operable by a mechanism arranged to control the operation of the electrical contacts of the switch which energizes the circuit of the starting field exciting winding 10.

Any suitable speed responsive mechanism may be used to operate my improved switch as illustrated in the drawing, and the centrifugal mechanism disclosed is not my invention, but is the invention of Alfred F. Welch and is described and claimed in his Patent 2,149,108, February 28, 1939, assigned to the General Electric Company, assignee of this application. This centrifugal mechanism includes a pair of weights 12 and 13 suitably secured to the rotor shaft 3 and adapted to react under centrifugal force at a predetermined speed to move an operating collar 14 axially of the shaft 3 for controlling the operation of the switch contacts.

In accordance with this invention, there is provided an improved switch mounting and terminal board assembly which includes a support member 15 of suitable insulating material, such as fiber board, which may be secured in the end shield 6 by a plurality of bolts 16. One side of the support member 15 is exposed to the exterior of the machine through an opening 17 in the end shield 6, while the other side is exposed to the interior of the machine. Terminal studs 18, 19, 20 and 21 are secured to the support member 15 and have exterior portions extending into the opening 17 and interior portions extending into the interior of the machine. By positioning the support member 15 in the opening 17, ready access is provided to the terminal studs for making the external connections and for altering the circuits of the machine, as will be hereinafter described. In making this type switch, certain specifications of the fire underwriters must be borne in mind, and, therefore, the connections to the switch and the motor windings are made in the illustrated arrangement through the four substantially equally spaced terminal studs 18, 19, 20, and 21, and through a pair of relatively movable electrical contacts which are adapted to complete a circuit therebetween by being biased into engagement with each other for regulating the connection of the starting winding to the source of electrical voltage. The terminal stud 18 is adapted to be connected to one side of the line or source of electrical voltage through a lead 22 on its exterior portion and to a terminal of the motor main field exciting winding 8 through a lead 23 on its interior portion. The terminal stud 19 is adapted to be similarly connected to the other side of the line or source of electrical voltage through a suitable lead 24 and to a terminal of the other of the motor main field exciting windings 9 through a suitable lead 25. The third of the terminal studs 20 is adapted to have its interior portion connected to the other terminal of the motor main field exciting windings 8 from the terminal stud 18, and the fourth of the terminal studs 21 is adapted to be similarly connected to the other terminal of the motor main field exciting winding 9 through a suitable lead 27. The circuit of the starting winding is adapted to be controlled by a pair of relatively movable electrical contacts which includes a substantially stationary contact 28 mounted on a supporting member 29 secured by suitable hollow rivets 30 and 31 to the support 15 and is adapted to be electrically connected to one terminal of the motor starting winding through a suitable conductor or lead 32 which extends from the rivet 31 to a terminal of the starting field exciting windings 10. The other of the relatively movable electric contacts includes a contacting element 33 which is supported on a flexible mounting member 34 of electrically conductive material which is provided with a pair of pads 35 adapted to be engaged by the collar 14 of the centrifugal mechanism for moving the relatively movable contact 33 towards the relatively stationary contact 28 to complete an electrical circuit therebetween by biasing these two contacts into engagement. The flexibility of the mounting member 34 is such that when the centrifugal weights 12 and 13 of the centrifugal mechanism move outwardly and draw the operating collar 14 towards the right, as shown in Fig. 1, the pads 35 will follow the movement of the collar and carry the relatively movable contact 33 out of engagement with the stationary contact 28, thereby breaking the electrical circuit therebetween. In order to prevent undue wear and movement of the flexible supporting member 34, a mounting stop member is provided having arms 36 which limit the outward movement of the wear pads 35 and of the mounting member 34, to which the stop is suitably secured, as by welding shown at 37 in Figs. 2 and 4. The mounting member 34 and the mounting stop member 36 are secured in position on the support 15 by a suitable rivet 38 and by the terminal stud 20 which extends through the mounting stop member and is insulated therefrom by an insulating sleeve 39 which extends around the portion of the stud 20 which passes through the mounting stop member 36. This stud is suitably held in position by a nut 40 which threadedly engages the end of the stud opposite the sleeve 39 and is adapted to draw up the sleeve 39 between a shoulder on the end of the stud 20, such that a shoulder on the insulating sleeve 39 firmly engages the outer surface of the mounting stop member 36 and secures it in position on the support 15. As shown, if desired an insulating washer 41 may be arranged between the support 15 and the nut 40 further to insure against electrical contact between the stud 20 and the mounting stop member 36. The movable electrical contact 33 is adapted to be secured through the mounting member 34 and the mounting stop member 36 to the support 15 and is adapted to be connected to one of the two line terminal studs 19 through a suitable lead or jumper 42 which is electrically connected to the rivet 38 as shown in Fig. 5 and which is adapted to be connected to a terminal of the motor main field exciting winding 9. The terminal stud 21 is adapted to be connected to the other terminal of the starting field exciting winding circuit through a suitable lead or conductor 43 which is shown in Fig. 5 as connected to the terminal on a condenser 44 connected in series with the starting field exciting winding 10. In order to complete the circuit for the field exciting windings of the motor for a relatively low voltage connection, a jumper 45 is arranged to connect the exterior portion of the line terminal stud 18 to the exterior portion of the terminal stud 21 and another jumper 46 is similarly arranged to connect electrically the line terminal stud 19 to the terminal stud 20, thus placing the two main field exciting windings 8 and 9 in parallel circuit relation across the source of voltage and the starting field exciting winding circuit across the field exciting winding 9 and, therefore, also across the relatively low line voltage.

For a high voltage connection of the motor, these two jumper members 45 and 46 are adapted to be disconnected from the terminal studs 18 and 19 and may be utilized as jumper means adapted to connect together the terminal studs 20 and 21 for providing a series connection of the main field exciting winding across the source of voltage. With this arrangement, the starting field exciting winding circuit again is connected across only one of the main field exciting windings and, therefore, is subjected to substantially only half the relatively high voltage, as is also each of the main field exciting windings 8 and 9. It can now be readily seen that not only are the line connections to the motor made through the opening 17 on the exterior portions of the terminal studs, but also the circuit arrangement of the field windings for low or high voltage operation is determined by the jumpers 45 and 46 which are also connected on the exterior portions of the terminal studs. Thus, all necessary external connections and alterations of the circuits of the machine can be conveniently made on the improved switch mounting and terminal board assembly which is readily accessible from the exterior of the machine.

If desired, the starting field exciting winding leads 32 and 42 may be interchanged in their connections to the terminal studs 21 and 19, thereby reversing the direction of excitation provided by the starting field exciting winding 10 and reversing the direction of rotation of the motor. Also, the starting field exciting winding circuit may, if desired, be connected between the stationary contact 28, that is the rivet 31 as shown in Fig. 5, and the terminal stud 21 instead of the terminal stud 20, providing the relatively movable contact 33 is connected to the line terminal stud 18 instead of the line terminal stud 19, thus placing the starting winding circuit across the field exciting winding 8 instead of the field exciting winding 9 and providing the same type of starting excitation to the machine as explained with reference to the connection shown in Figs. 2 and 5. Thus, my improved switch and switch mounting and terminal board assembly provides an arrangement which can be utilized for connecting the motor for operation on either a relatively high voltage or a relatively low voltage and also provides for the reconnection of the starting field exciting winding circuit for rotation of the motor in either direction, which connections can be conveniently made from the exterior of the machine.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A dual voltage centrifugal switch member for a motor having a starting field exciting winding circuit and two main field exciting windings, said switch including one terminal stud adapted to be connected to one side of a source of electrical voltage and to a terminal of one of the motor main field exciting windings, a second terminal stud adapted to be connected to the other side of the source of electrical voltage from said one terminal stud and to a terminal of the other of the motor main field exciting windings, a third terminal stud adapted to be connected to the other terminal of said one of the motor main field exciting windings, a fourth terminal stud adapted to be connected to the other terminal of said second of the motor main field exciting windings, said studs having exterior portions accessible from the exterior of the motor for making the connections to said source of electrical voltage and internal portions for making said connections to said field exciting windings, a stationary electrical contact adapted to be connected to one terminal of the motor starting winding circuit, a movable electrical contact adapted to be connected to one of said two first-mentioned terminal studs adapted to be connected to a terminal of one of the motor main field exciting windings, said stationary and movable contacts being arranged to complete an electric circuit therebetween, the terminal stud adapted to be connected to said other terminal of the motor main field exciting winding which is adapted to be connected to said movable contact being adapted to be connected to the other terminal of the motor starting winding circuit, and means for electrically connecting together said one and said fourth terminal studs and means for electrically connecting together said second and third terminal studs for providing a parallel connection of the main field exciting windings across the source of voltage for a low voltage connection, said last two-mentioned electrical connections being made on the exterior portions of said terminal studs, said last two-mentioned electrical connecting means being adapted to be disconnected from said one and said second terminal studs and adapted to connect together said third and fourth terminal studs for providing a series connection of the main field exciting winding across the source of voltage for a high voltage connection thereof.

2. A dual voltage centrifugal switch member for a motor having a starting field exciting winding circuit and two main field exciting windings, said switch including a support of insulating material, one terminal stud adapted to be connected to one side of a source of electrical voltage and to a terminal of one of the motor main field exciting windings, a second terminal stud adapted to be connected to the other side of the source of electrical voltage from said one terminal stud and to a terminal of the other of the motor main field exciting windings, a third terminal stud adapted to be connected to the other terminal of said one of the motor main field exciting windings from said one terminal stud, a fourth terminal stud adapted to be connected to the other terminal of said second of the motor main field exciting windings from said second terminal stud, said terminal studs having exterior portions accessible from the exterior of the motor for making said connections to said source of electrical voltage and interior portions for making said connections to said field exciting windings, a pair of relatively movable electrical contacts adapted to complete a circuit therebetween, one of said relatively movable contacts being secured to said support and adapted to be connected to one terminal of the motor starting winding circuit, a flexible mounting member of electrically conductive material, the other of said relatively movable electrical contacts being secured to said support through said mounting member and being adapted to be connected to one of said two first-mentioned terminal studs adapted to be connected to a terminal of one of the motor main field exciting windings, the terminal stud adapted to be connected to said other terminal of the motor main field exciting winding which is adapted to be connected to said one relatively movable contact being adapted to be connected to the other terminal of the motor starting winding circuit, one of said terminal studs adapted to be connected to the other terminal of one of the motor main field exciting windings extending through said flexible mounting member, means for insulating said stud from said mounting member, and means for electrically connecting together said one and said fourth terminal studs and means for electrically connecting together said second and third terminal studs for providing a parallel connection of the main field exciting windings across the source of voltage for a low voltage connection, said last two-mentioned electrical connections being made on the exterior portions of said terminal studs, said last two-mentioned electrical connecting means being adapted to be disconnected from said one and said second terminal studs and adapted to connect together said third and fourth terminal studs for providing a series connection of the main field exciting windings across the source of voltage for a high voltage connection thereof.

3. A dual voltage centrifugal switch member for a motor having a starting field exciting winding circuit and two main field exciting windings, said switch including a support of insulating material, one terminal stud adapted to be connected to one side of a source of electrical voltage and to a terminal of one of the motor main field exciting windings, a second terminal stud adapted to be connected to the other side of the source of electrical voltage from said one terminal stud and to a terminal of the other of the motor main field exciting windings, a third terminal stud adapted to be connected to the other terminal of said one of the motor main field exciting windings from said one terminal stud, a fourth terminal stud adapted to be connected to the other terminal of said second of the motor main field exciting windings from said second terminal stud, said terminal studs having exterior portions accessible to the exterior of said motor for making said connections to said source of electrical voltage and internal portions for making said connections to said motor main field exciting windings, a stationary electrical contact secured to said support and adapted to be connected to one terminal of the motor starting winding circuit, a mounting member of electrically conductive material, a movable electrical contact secured to said support through said mounting member and being adapted to be connected to one of said two first-mentioned terminal studs adapted to be connected to a terminal of one of said motor main field exciting windings, said stationary and movable contacts being arranged to complete an electric circuit therebetween, the terminal stud adapted to be connected to said other terminal of the motor main field exciting winding which is adapted to be connected to said movable contact being adapted to be connected to the other terminal of the motor starting winding circuit, one of said terminal studs adapted to be connected to the other terminal of one of the motor main field exciting windings extending through said flexible mounting member, means for insulating said stud from said mounting member, and means for electrically connecting together said one and said fourth terminal studs and means for electrically connecting together said second and third terminal studs for providing a parallel connection of the main field exciting windings across the source of voltage for a low voltage connection, said last two-mentioned electrical connections being made on the exterior portions of said terminal studs, said last two-mentioned electrical connecting means being adapted to be disconnected from said one and said second terminal studs and adapted to connect together said third and fourth terminal studs for providing a series connection of the main field exciting winding across the source of voltage for a high voltage connection thereof.

4. A dual voltage centrifugal switch member for a motor having a starting field exciting winding circuit and two main field exciting windings, said switch including a support of insulating material, four substantially equally spaced terminal studs secured to said support, one of said terminal studs adapted to be connected to one side of a source of electrical voltage and to a terminal of one of the motor main field exciting windings, a second of said terminal studs being adapted to be connected to the other side of the source of electrical voltage from said one terminal stud and to a terminal of the other of the motor main field exciting windings, a third of said terminal studs being adapted to be connected to the other terminal of said one of the motor main field exciting windings from said one terminal stud, the fourth of said terminal studs being adapted to be connected to the other terminal of said second of the motor main field exciting windings from said second terminal stud, said terminal studs having exterior portions accessible from the exterior of said motor for making the connections to said source of electrical voltage and interior portions for making the connections to said motor main field exciting windings, a stationary electrical contact secured to said support and adapted to be connected to one terminal of the motor starting winding circuit, a flexible mounting member of electrically conductive material, a movable electrical contact flexibly secured to said support through said mounting member and being adapted to be connected to one of said two first-mentioned terminal studs adapted to be connected to a terminal of one of the motor main field exciting windings, the terminal stud adapted to be connected to said other terminal of the motor main field exciting winding which is adapted to be connected to said movable contact being adapted to be connected to the other terminal of the motor starting winding circuit, one of said terminal studs extending through said flexible mounting member, means including an insulating sleeve arranged around a portion of said last-mentioned terminal stud for insulating said stud from said flexible mounting member, and means for electrically connecting together said one and said fourth terminal studs and means for electrically connecting together said second and third terminal studs for providing a parallel connection of the main field exciting windings across the source of voltage for a low voltage connection, said last two-mentioned electrical connections being made on the exterior portions of said terminal studs, said last two-mentioned electrical connecting means being adapted to be disconnected from said one and said second terminal studs and adapted to connect together said third and fourth terminal studs for providing a series connection of the main field exciting windings across the source of voltage for a high voltage connection thereof.

5. A mounting and terminal board assembly for a dual voltage centrifugally actuated switch of a motor having two main field exciting windings and a starting field exciting winding circuit, said assembly having a supporting member of insulating material adapted to carry stationary and movable contacts of said switch thereon, four terminal studs secured to said supporting member, each of said studs having an exterior portion accessible from the exterior of said motor and an interior portion, one of said studs having its exterior portion adapted to be connected to one side of a source of electrical voltage and its interior portion adapted to be connected to a terminal of one of the motor main field exciting windings, a second of said terminal studs having its exterior portion adapted to be connected to the other side of said source of electrical voltage and its interior portion adapted to be connected to a terminal of the other of the main field exciting windings, a third of said terminal studs being adapted to have its interior portion connected to the other terminal of said one motor main field exciting winding, a fourth of said terminal studs being adapted to have its interior portion connected to the other terminal of said second motor main field exciting winding, and means for electrically connecting together said one and said fourth terminal studs and means for electrically connecting together said second and third terminal studs for providing a parallel connection of the motor main field exciting windings across the source of voltage for a low voltage connection, said last two-mentioned electrical connections being made on the exterior portions of said terminal studs, said last two-mentioned electrical connections being adapted to be disconnected from said one and said second terminal studs and adapted to connect together said third and fourth terminal studs for providing a series connection of the motor main field exciting windings across the source of voltage for a high voltage connection.

6. A mounting and terminal board assembly for a dual voltage centrifugally actuated switch of a motor having two main field exciting windings and a starting field exciting winding circuit, said assembly having a supporting member adapted to carry said stationary and movable contacts of said switch thereon, said supporting member having one side exposed to the exterior of said motor and the other side exposed to the interior, four terminal studs secured to said supporting member, each of said studs having an exterior portion accessible from the exterior of said motor and an interior portion, one of said studs having its exterior portion adapted to be connected to one side of a source of electrical voltage and its interior portion adapted to be connected to a terminal of one of the motor main field exciting windings, a second of said terminal studs having its exterior portion adapted to be connected to the other side of said source of electrical voltage and its interior portion adapted to be connected to a terminal of the other of the main field exciting windings, a third of said terminal studs being adapted to have its interior portion connected to the other terminal of said one motor main field exciting winding, a fourth of said terminal studs being adapted to have its interior portion connected to the other terminal of said second motor main field exciting winding, and means for electrically connecting together said one and said fourth terminal studs and means for electrically connecting together said second and third terminal studs for providing a parallel connection of the motor main field exciting windings across the source of voltage for a low voltage connection, said last two-mentioned electrical connections being made on the exterior portions of said terminal studs, said last two-mentioned electrical connections being adapted to be disconnected from said one and said second terminal studs and adapted to connect together said third and fourth terminal studs for providing a series connection of the motor main field exciting windings across the source of voltage for a high voltage connection.

7. A mounting and terminal board assembly for a dual voltage centrifugally actuated switch of a motor having two main field exciting windings and a starting field exciting winding circuit, said assembly having a supporting member adapted to carry said stationary and movable contacts of said switch thereon, said supporting member having one side exposed to the exterior of said motor and the other side exposed to the interior, four terminal studs secured to said supporting member, each of said studs having an exterior portion accessible from the exterior of said motor and an interior portion, one of said studs having its exterior portion adapted to be connected to one side of a source of electrical voltage and its interior portion adapted to be connected to a terminal of one of the motor main field exciting windings, a second of said terminal studs having its exterior portion adapted to be connected to the other side of said source of electrical voltage and its interior portion adapted to be connected to a terminal of the other of the main field exciting windings, a third of said terminal studs being adapted to have its interior portion connected to the other terminal of said one motor main field exciting winding, a fourth of said terminal studs being adapted to have its interior portion connected to the other terminal of said second motor main field exciting winding, a mounting member of conductive material secured to said supporting member for carrying said movable contact, one of said terminal studs adapted to be connected to the other terminal of one of the motor main field exciting windings extending through said mounting member, means for insulating said stud from said mounting member, and means for electrically connecting together said one and said fourth terminal studs and means for electrically connecting together said second and third terminal studs for providing a parallel connection of the motor main field exciting windings across the source of voltage for a low voltage connection, said last two-mentioned electrical connections being made on the exterior portions of said terminal studs, said last two-mentioned electrical connections being adapted to be disconnected from said one and said second terminal studs and adapted to connect together said third and fourth terminal studs for providing a series connection of the motor main field exciting windings across the source of voltage for a high voltage connection.

GLENN D. WILLITS.

REFERENCES CITED

The following references are of record in the file of this patent:

UNITED STATES PATENTS

| Number | Name | Date |
|---|---|---|
| 2,057,525 | Horning | Oct. 13, 1936 |
| 2,295,331 | Brooks | Sept. 8, 1942 |
| 2,319,490 | Clark | May 18, 1943 |

FOREIGN PATENTS

| Number | Country | Date |
|---|---|---|
| 344,845 | Great Britain | Mar. 5, 1931 |